April 21, 1931.  T. L. BURTON  1,801,845
ANGLE COCK HOLDER
Filed May 5, 1927
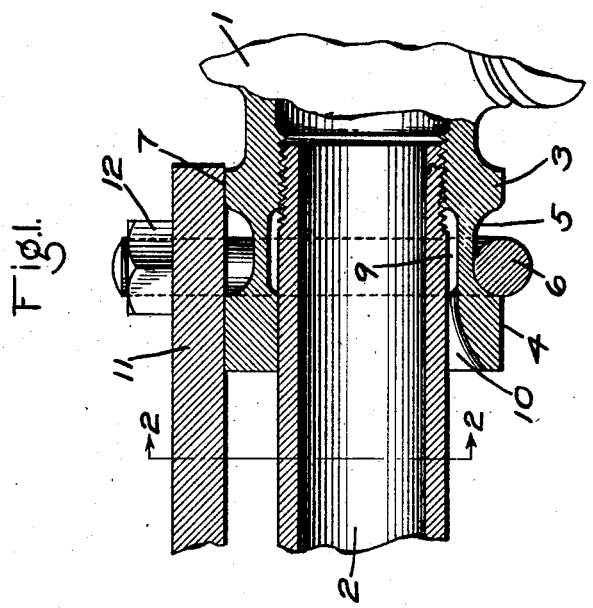
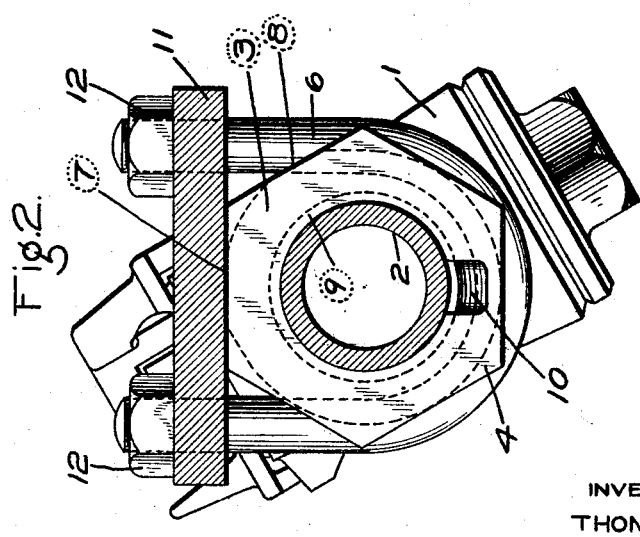
INVENTOR
THOMAS L. BURTON
BY Wm. M. Cady
ATTORNEY Patented Apr. 21, 1931

1,801,845

UNITED STATES PATENT OFFICE

THOMAS L. BURTON, OF NEW YORK, N. Y., ASSIGNOR TO THE WESTINGHOUSE AIR BRAKE COMPANY, OF WILMERDING, PENNSYLVANIA, A CORPORATION OF PENNSYLVANIA

ANGLE-COCK HOLDER

Application filed May 5, 1927. Serial No. 189,103.

This invention relates to angle cock or fitting holders, and has for an object the provision of improved means for preventing rotative as well as longitudinal movement of the angle cock or fitting and which will maintain the cock or fitting in the desired position relative to the car to which it is applied.

Referring to the drawing, in which like reference characters refer to like parts, Fig. 1 is a partial longitudinal sectional view of a portion of an angle cock and angle cock holder embodying the invention; and Fig. 2 is a sectional view taken on the line 2—2 of Fig. 1.

Referring now in detail to the drawing, the reference character 1 indicates an angle cock or fitting for use in railway cars for controlling, or forming a communication through the usual train brake pipe 2. This angle cock has a pipe portion which is provided with a forward circular portion 3 and a rear hexagonal portion 4. These portions 3 and 4 are spaced apart, and between them there is a groove 5 provided which is adapted to receive a portion of a securing member, preferably in the form of a U bolt 6. The circular portion 3 has flat faces 7 and 8 disposed in the plane of corresponding flat faces of the hexagonal portion 4. Within the central opening of the pipe portion, and adjacent the circular portion 3, the brake pipe 2 has a threaded connection with the angle cock or fitting. The pipe portion extending rearwardly beyond the circular portion 3 serves as a pipe support and relieves the pipe threads of strain which might otherwise cause leakage.

Between the interior threaded portion and the hexagonal portion 4, the pipe portion is provided with an interior annular recess 9 which forms a pocket surrounding the brake pipe for the collection of moisture which might otherwise collect between the brake pipe and the angle cock or fitting and cause the threaded connection to become rusted or otherwise damaged. Moisture collected in this pocket will drain through a passage or groove 10 which extends from the lowermost wall of the pocket, rearwardly through the hexagonal portion 4 and will be discharged from the angle cock at a point remote from the U bolt 6.

Secured to or being a part of a railway car, is a supporting member 11 which is apertured for the reception of the ends of the U bolt 6, and the angle cock is clamped in position with one of the faces of the hexagonal portion, and either the face 7 or 8 of the circular portion engaging the underside of the support 11. Nuts 12 are applied to the threaded ends of the U bolt and are screwed down, so as to clamp the angle cock in engagement with the supporting member.

Having now described my invention, what I claim as new and desire to secure by Letters Patent, is:—

An angle fitting having a portion defining an opening for the reception of the end portion of a pipe, screw threads on said portion within said opening for connection with the screw threaded end of the pipe, said portion having a projection forming a support for the pipe rearwardly of said screw threads and having formed therein a drainage channel extending longitudinally from the vicinity of said screw threads to the atmosphere at the extreme rear end of said portion.

In testimony whereof I have hereunto set my hand.

THOMAS L. BURTON.